(12) United States Patent
Tajima et al.

(10) Patent No.: US 7,507,487 B2
(45) Date of Patent: Mar. 24, 2009

(54) SOLID POLYMER FUEL CELL WITH REACTANT AIR HUMIDIFIED BY A PROCESSED WATER TANK

(75) Inventors: Osamu Tajima, Gunma (JP); Akira Hamada, Tochigi (JP)

(73) Assignee: Sanyo Electric Co., Ltd., Osaka (JP)

( * ) Notice: Subject to any disclaimer, the term of this patent is extended or adjusted under 35 U.S.C. 154(b) by 281 days.

(21) Appl. No.: 10/221,162

(22) PCT Filed: Mar. 23, 2001

(86) PCT No.: PCT/JP01/02323

§ 371 (c)(1),
(2), (4) Date: Sep. 18, 2002

(87) PCT Pub. No.: WO01/71837

PCT Pub. Date: Sep. 27, 2001

(65) Prior Publication Data

US 2003/0129470 A1    Jul. 10, 2003

(30) Foreign Application Priority Data

Mar. 23, 2000  (JP) .............................. 2000-081445
Apr. 5, 2000   (JP) .............................. 2000-103382

(51) Int. Cl.
H01M 8/04   (2006.01)
(52) U.S. Cl. .............................. 429/12; 429/26; 429/39
(58) Field of Classification Search .................. 429/12, 429/26, 39
See application file for complete search history.

(56) References Cited

U.S. PATENT DOCUMENTS

| | | | | |
|---|---|---|---|---|
| 5,360,679 A | * | 11/1994 | Buswell et al. | ............... 429/19 |
| 5,980,716 A | | 11/1999 | Horinouchi et al. | |
| 5,985,474 A | | 11/1999 | Chen et al. | |
| 6,124,052 A | * | 9/2000 | Katoh et al. | ................... 429/33 |
| 6,294,277 B1 | * | 9/2001 | Ueno et al. | .................... 429/22 |

FOREIGN PATENT DOCUMENTS

| | | |
|---|---|---|
| JP | 6-333583 | 12/1994 |
| JP | 06-333583 | 12/1994 |
| JP | 8-315838 | 11/1996 |
| JP | 10-106593 | 4/1998 |
| JP | 2000-58092 | 2/2000 |

OTHER PUBLICATIONS

J.P. Shoesmith, et al., "Status of Solid Polymer Fuel Cell System Development," *Journal of Power Sources*, vol. 49, Apr. 1994, pp. 129-142.

* cited by examiner

*Primary Examiner*—Mark Ruthkosky
(74) *Attorney, Agent, or Firm*—Westerman, Hattori, Daniels & Adrian, LLP.

(57) ABSTRACT

A water tank 21 for stocking processed water used for cooling of a solid polymer type fuel cell 6, etc., cooling water supply means for supplying the processed water to the fuel cell 6 reactant air supplying means for supplying the reactant air to the fuel cell 6, and fuel gas supply means for electrode reaction are provided, and the reactant air supply means passes the reactant air through the water tank 21 to add moisture to the gas.

28 Claims, 6 Drawing Sheets

SOLID POLYMER FUEL CELL WITH REACTANT AIR HUMIDIFIED BY A PROCESSED WATER TANK

TECHNICAL FIELD

The present invention relates to a solid polymer type fuel cell for humidifying reactant air (air) to be supplied to an air electrode of the solid polymer type fuel cell.

There has been recently a fuel cell power generating system in which fuel is promoted to make an electrochemical reaction and electric energy is directly picked up by flow of electrons generated at the time of the electrochemical reaction. The fuel cell power generating system converts the chemical energy possessed by fuel such as natural gas, city gas, methanol, propane gas or the like (hereinafter referred to as fuel gas) to electric energy, and it comprises a fuel-cell main body, an apparatus for generating hydrogen from fuel, an apparatus for converting DC output generated in the fuel-cell main body to alternating current, a heat exchanger for keeping the temperature of the reactant air to a temperature suitable for the operation of the fuel-cell main body and occurrence of hydrogen, etc.

In such a fuel cell power generating system, fuel gas such as natural gas, city gas, methanol or the like is subjected to steam reforming (chemical reaction) under the action of reforming catalyst filled in a reformer to generate reformed gas containing hydrogen as a main component. The reformed gas is supplied to a CO shift converter to convert carbon monoxide contained in the reformed gas to carbon dioxide, and then the concentration of the residual carbon monoxide is reduced to a predetermined concentration value or less in a CO remover. Hydrogen thus achieved makes an electrochemical reaction with oxygen contained in air in the fuel-cell main body to perform power generation. Solid polymer type fuel cell has been proposed as a fuel cell used in such a fuel cell power generating system as described above.

The fuel-cell main body of the solid polymer type fuel cell comprises a fuel electrode to which reformed gas is supplied, an air electrode to which reactant air (air) is supplied and an electrolyte membrane (ion exchange membrane). At the fuel electrode side of the solid polymer type fuel cell thus constructed, the fuel electrode side of the membrane is liable to be dried because water molecules pass through the ion exchange membrane by an electroendosmosis effect little by little when ionized hydrogen moves through the ion electrolyte membrane (ion exchange membrane). In order to prevent this, the reformed (hydrogen) gas is added with water and supplied to the electrode to humidify the ion exchange membrane.

Further, at the air electrode side of the membrane, in addition to leaching of water due to the electroendosmosis, water is generated through the reaction between hydrogen ions passing through the membrane and the oxygen, and the electrode is wetted with the water thus generated to obstruct diffusion of oxygen, so that there is a tendency that the power generation performance is reduced. Such water can be removed by gas for electrode reaction (hereinafter referred to as reactant air) supplied to the air electrode, however, the evaporation amount of water is increased due to flow of a large amount of air and thus the ion exchange membrane is dried. In order to prevent this, the fuel cell is specially equipped with a dedicated humidifier for applying moisture to the air and then supplying the humidified air to the air electrode to thereby prevent the ion exchange membrane from being dried.

As described above, it is necessary to perform moisture management on reformed gas and reactant air (air) being used in the solid polymer type fuel cell. Therefore, in order to supply such gas for electrode reaction, there has been hitherto needed a dedicated external humidifier having a mechanism for heating water in a heater to generate steam or the like and a large amount of processed water for humidification, and also there has been needed a heat exchanger to withdraw water for the humidifier and a dedicated water resupply device for successively resupplying processed water to the humidifier.

Accordingly, the present invention has been implemented to overcome the problem of the prior art described above, and has an object to provide a solid polymer type fuel cell in which reactant gas to be used in an electrode is moisturized and then supplied to the electrode with a simple mechanism while using existing equipment possessed by the fuel cell.

SUMMARY OF THE INVENTION

The present invention is characterized by a solid polymer type fuel cell comprising: a fuel-cell main body for performing power generation through the electrochemical reaction between hydrogen in reformed gas and oxygen in reactant air; a reactant air supply portion for supplying the reactant air to the fuel-cell main body; a reformed gas supply portion for supplying the reformed gas to the fuel-cell main body; and a processed water supply portion for supplying processed water, wherein the processed water supply portion supplies the processed water to the reformed gas supply portion to humidify the reformed gas, humidifies the reactant air supplied from the reactant air supply portion by using the processed water, and then supplying the humidified reactant air to the fuel-cell main body.

The present invention further comprises a cooling portion for circulating the processed water from the processed water supply portion to the fuel-cell main body to cool the fuel-cell main body.

In the present invention, the processed water supply portion comprises a water tank in which water is stocked, and a liquid level control portion for keeping the water level of processed water in a predetermined range so that a gas-phase portion is formed in the water tank at all times, the reactant air from the reactant air supply portion being humidified while passing through the water tank and supplied to the fuel-cell main body.

In the present invention, the liquid level control portion comprises a water level gauge for detecting the water level of the processed water and a motor operated valve for controlling supply of the processed water from a processed water source into the processed water tank.

In the present invention, the processed water supply portion comprises a processed water tank in which processed water is stocked, and temperature adjusting means for keeping the temperature of the processed water in the processed water tank in a predetermined range, wherein the degree of humidification is adjusted by a set temperature when the reactant air from the reactant air supply portion is humidified while passing through the processed water tank.

In the present invention, the upper limit value of the predetermined range of the processed water to be adjusted by the temperature adjusting means is varied in accordance with the operation temperature of the fuel cell.

In the present invention, the predetermined temperature range of the processed water to be adjusted by the temperature adjusting means ranges from 60° C. to 80° C.

In the present invention, the temperature adjusting means has an electrical heater.

The present invention further comprises a steam supply portion for vaporizing the processed water from the processed into steam and adding the steam to raw material supplied to the reformed gas supply portion, wherein the steam supply portion adjusts the addition amount of water so that the ratio (S/C ratio) between the amount of supplied water and the amount of raw fuel gas ranges from 3 to 4.

In the present invention, the reformed gas supply portion has a CO remover for reducing the concentration of carbon monoxide in the reformed gas, and the reformed gas output from the CO remover is supplied to the fuel-cell main body without removing moisture therefrom.

The present invention further comprises water processing means for subjecting city water to predetermined processing to generate processed water having low electrical conductivity, and supplying the processed water thus generated to the processed water supply portion.

The present invention further comprises an exhaust heat recovery portion that is supplied with high-temperature gas discharged from the fuel-cell main body and recovers heat generated in the fuel-cell main body through the electrochemical reaction between hydrogen in the reformed gas and oxygen in the reactant air.

In the present invention, the exhaust heat recovery portion comprises a heat exchanger in which water is circulated to be heat-exchanged with high-temperature gas discharged from the fuel-call main body, and a hot water tank for stocking hot water from the heat exchanger and supplying water to the heat exchanger.

The present invention further comprises a heat exchanger that is attached to the processed water supply portion and performs the heat exchange between the processed water and the water while the processed water and the water are circulated in the heat exchanger so as not to be mixed with each other.

In the present invention, the exhaust heat recovery portion comprises a heat exchanger in which the processed water from the processed water supply portion is circulated to be heat-exchanged with high-temperature gas discharged from the fuel-cell main body, thereby performing exhaust heat recovery.

The present invention further comprises a cooling portion in which cooling refrigerant is circulated, the cooling portion being attached to the fuel-cell main body and performing heat exchange with the fuel-cell main body to cool the fuel-cell main body, wherein heat exchange is performed between the processed water from the processed water supply means and the cooling refrigerant from the cooling portion while the processed water and the cooling refrigerant are circulated without being mixed with each other, thereby recovering heat generated in the fuel-cell main body to the processed water supply portion.

The present invention further comprises a water withdrawing portion for withdrawing water generated in the fuel-cell main body.

In the present invention, the water withdrawing portion comprises a heat exchanger for performing the heat exchange between discharge gas from the fuel-cell main body and water circulated therein to liquefy and withdraw water from the discharge gas, and a water resupply portion for temporarily stocking the water withdrawn by the heat exchanger and city water.

In the present invention, the water resupply portion supplies the stocked water to the processed water supply portion in accordance with the water level thereof.

In the present invention, the water resupply portion comprises a water level gauge for detecting the water level and controls supply of the city water to the water resupply portion and supply of stocked water to the processed water portion in accordance with the detection result of the water level gauge.

The present invention further comprises a water processing portion disposed at the front stage of the water resupply portion or between the water resupply portion and the processed waster supply portion, the water processing portion performing predetermined processing on city water to generate processed water having low electrical conductivity, and supplying the processed water thus generated to the water resupply portion or the processed water supply portion.

The present invention further comprises a cooling portion which is attached to the fuel-cell main body and in which cooling refrigerant is circulated to be heat-exchanged with the fuel-cell main body to cool the fuel-cell main body, wherein the processed water from the processed water means and the cooling refrigerant from the cooling portion are heat-exchanged with each other while the processed water and the cooling refrigerant are circulated so as not to be mixed with each other, thereby recovering heat generated in the fuel-cell main body to the processed waster supply portion.

The present invention further comprises a first processed water supply path for directly supplying the stocked water of the water resupply portion to the processed supply portion; a second processed water supply portion for supplying, through a water processing device for conducting predetermined processing on the stocked water of the water resupply portion to generate processed water having low electrical conductivity, the processed water to the processed water supply portion; a water quality detector for detecting the water quality of the stocked water of the water resupply portion; and a processed water path switching portion for selecting one path of the first processed water supply path and the second processed water supply path and supplying the processed water to the processed water portion, which are disposed between the water resupply portion and the processed water supply portion.

In the present invention, the water quality detector comprises a conductometric device of water or water quality sensor.

The present invention further comprises: a first processed water supply path for directly supplying the stocked water of the water resupply portion to the processed supply portion; a second processed water supply portion for supplying, through a water processing device for conducting predetermined processing on the stocked water of the water resupply portion to generate processed water having low electrical conductivity, the processed water to the processed water supply portion; and a processed water path switching portion for selecting one path of the first processed water supply path and the second processed water supply path at a predetermined time cycle and supplying the processed water to the processed water portion, which are disposed between the water resupply portion and the processed water supply portion.

In the present invention, the water processing portion further includes a mechanism for heating the processed water of the processed water supply portion by heat generated from a power generation system having the fuel cell.

In the present invention, the mechanism has a heat exchanger for adjusting the temperature of the processed water of the processed water supply portion through heat exchange using the heat generated in the power generating system.

The present invention further comprises a heat exchanger that is attached to the processed water supply portion and in which the processed water in the processed water supply portion is circulated, wherein the temperature of the processed water in the processed water supply portion is adjusted through the heat exchange in the heat exchanger.

The present invention is characterized by comprising: a fuel-cell main body for-performing power generation through the electrochemical reaction between hydrogen in reformed gas and oxygen in reactant air; a reactant air supply portion for supplying the reactant air to the fuel-cell main body; a reformed gas supply portion for supplying the reformed gas to the fuel-cell main body; and a processed water supply portion for supplying processed water to at least one of the reformed gas supply portion and the fuel-cell main body, characterized in that the reactant air supplied from the reactant air supply portion is passed through the processed water stocked in the processed water supply portion, and then the humidified reactant air is supplied to the fuel-cell main body.

The present invention is characterized in that reactant air used at an air electrode of a solid polymer type fuel cell is humidified with cooling water of the fuel cell or a power generation system having the fuel cell and then supplied to the air electrode.

The present invention is characterized in that reactant air used at an air electrode of a solid polymer type fuel cell is humidified with cooling water circulated in the fuel cell, and then supplied to the air electrode.

BEST MODES FOR IMPLEMENTING THE INVENTION

The present invention will be described in more detail with reference to the accompanying drawings.

The following embodiments will be described while focusing on a case where a solid polymer type fuel cell (in the following description, hydrogen generating system, electrochemical reaction system (fuel cell main body), a cooling system, etc. will collectively means a fuel cell) is used in a power generating system for a domestic compact power source or the like. Further, for the sake of simplicity of the description on a case where reformed gas containing hydrogen and air containing oxygen are used as gas for electrode reaction supplied to the main body of a fuel cell, the air to be supplied to an electrode will be particularly referred to as reactant air, and the electrode to which the reactant air is supplied will be referred to as an air electrode. Further, in the present invention, the electrode reaction gas is not necessarily limited to the above materials.

A first embodiment of a solid polymer type fuel cell according to the present invention will be described with reference to FIG. 1.

Figure 1:
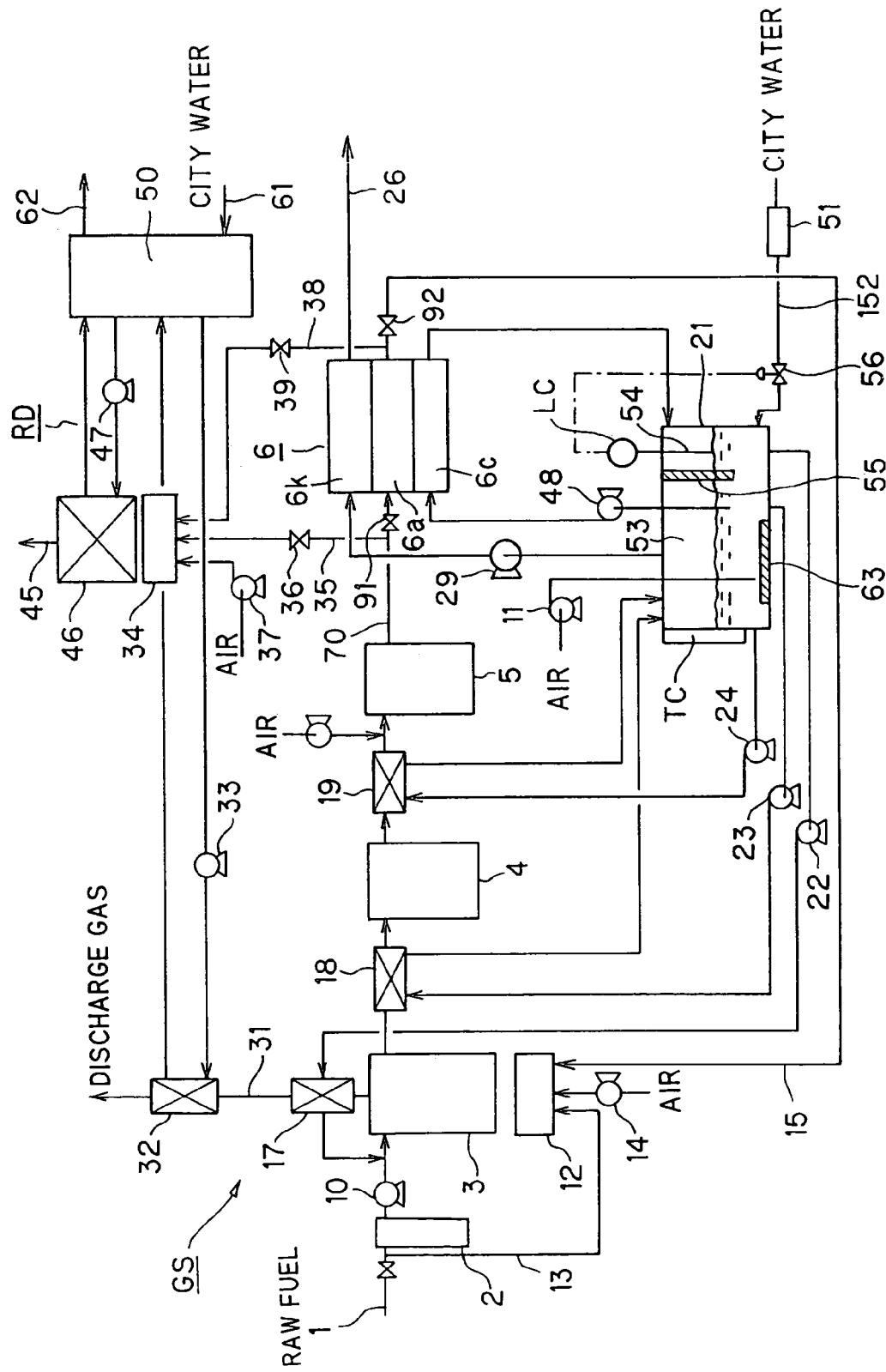
FIG. 1 is a systematic diagram showing a first embodiment of a power generating system equipped with a solid polymer type fuel cell according to the present invention.

As shown in FIG. 1, a power generating system GS using the fuel cell according to the first embodiment is equipped with a heat recovery device RD in addition to the fuel cell, for example. The heat recovery device RD and the fuel cell are linked to each other through a water or heat medium circulating path containing a hot water reservoir tank 50 and a water processing device 51 using an ion exchange resin or the like, etc.

City water is supplied to the water processing device 51. The city water is reformed, for example, to processed water having low electric conductivity (which will be referred to as processed water in the present invention) so that it does not effect the insulation of the fuel cell in the water processing device 51, and the processed water is supplied through a processed water pipe 152 into a water tank 21 described later.

The fuel cell according to this embodiment is constructed by a device for supplying reformed gas for electrode reaction (hereinafter referred to as reformed gas) which comprises a desulfurizer 2, a reformer 3, a CO shift converter 4, a CO remover 5, etc., a fuel-cell main body 6 comprising a fuel electrode, an air electrode and an ion exchange membrane sandwiched therebetween, a reactant air (air) supplying device comprising an air pump 11, a water tank 21, etc., and a fuel cell cooling device comprising the water tank 21, a pump 48, a cooling portion 6c, etc.

The power generated in the fuel cell is boosted by a DC/DC converter (not shown), and it is connected to a commercial power source through a power distribution system linked inverter (not shown). On the other hand, the power from the commercial power source is supplied a power for illumination, air conditioners and other electronic equipment of houses, offices, etc.

In a power generating system GS using such a fuel cell, effective use of energy possessed by fuel used in a fuel cell is promoted, for example by withdrawing hot water from city water with heat generated at the power generation time of the fuel cell, stocking the hot water in a hot water reservoir tank 50 and supplying the hot water to a bath, a kitchen, etc.

In the reformed gas supply device of the fuel cell described above, raw fuel gas such as natural gas, city gas, methanol, LPG, butane or the like is supplied to the desulfurizer 2 through a fuel pipe 1 to remove sulfur components from the raw fuel gas. When the raw fuel gas passed through the desulfurizer 2 is boosted in pressure by a booster pump 10 and supplied to the reformer 3, the raw fuel gas is confluent with steam achieved by passing water from the water tank 21 through the water pump 22 and then heating the water in a heat exchanger 17, and then supplied to the reformer 3.

In the reformer 3 is generated reformed gas containing hydrogen, carbon dioxide and carbon monoxide. The gas passed through the reformer 3 is supplied to the CO shift converter 4, and monoxide contained in the reformed gas is converted to carbon dioxide in the CO shift converter 4. The gas passed through the CO shift converter 4 is supplied to the CO remover 5, and unconverted carbon monoxide contained in the gas passed through the CO shift converter 4 is oxidized and converted to carbon dioxide in the CO remover 5. The gas (reformed gas) passed through the CO remover 5, in which the concentration of carbon monoxide is reduced to 10 ppm or less and the hydrogen concentration is high, is supplied to the fuel electrode of the fuel-cell main body 6.

In the fuel cell having the above construction, power generation is performed through the chemical reaction between high-concentration hydrogen contained in the reformed gas and oxygen in the air which is supplied through the air pump 11, the water tank 21, etc. and then supplied to the air electrode 6k, and heat based on the electrochemical reaction occurs. The cooling device of the fuel cell is disposed in juxtaposition with the fuel electrode 6a and the air electrode 6k of the fuel-cell main body 6, and the processed water in the water tank 21 is circulated as cooling water into the cooling portion 6c by using the pump 48 to control the temperature in the fuel-cell main body 6 with the cooling water so that the temperature is kept to a temperature suitable for power generation.

Since the chemical reaction in the reformer 3 is an endothermal reaction, it is necessary to make the chemical reaction while heating at all times by a burner 12. The burner 12 is equipped as heating means. The burner 12 is supplied with raw fuel gas through a fuel pipe 13, and further supplied with combustion air through a fan 14. In addition, the burner 12 is supplied with non-reacted hydrogen gas (off gas) discharged from the fuel electrode 6a through a pipe 15. In FIG. 1, the raw fuel supplied to the burner 12 is directly supplied from the fuel pipe 1, however, it may be supplied to the burner 12 through the desulfurizer 2.

At the time when the system GS is started, the fuel gas is supplied to the burner 12 through the fuel pipe 13, and the combustion air is also supplied through the fan 14 to thereby perform combustion. When the operation of the fuel-cell main body 6 is stabilized after the start, the supply of the fuel gas from the fuel pipe 13 is interrupted, and off gas is supplied as fuel gas to the burner 12 through the pipe 15.

On the other hand, since the chemical reaction made in the CO shift converter 4, the CO remover 5 is an exothermal reaction, in the CO remover 5 a burner (not shown) is made to induce combustion only at the time when the system is started, thereby generating combustion gas, and at this time the temperature of the CO remover 5 rises up to the exothermal reaction temperature by the heat of the combustion gas thus generated. Thereafter, the reaction temperature is kept by the heat of the exothermal reaction being made in the CO remover 5. As occasion demands, the CO shift converter 4 and the CO remover 5 are controlled to be cooled from the external to prevent the temperature thereof from being increased to the reaction temperature or more. Once the temperature is increased to the reaction temperature, the cooling control is carried out so that the temperature is prevented from exceeding the reaction temperature due to the heat of the exothermal reaction.

As described above, the reaction temperature is kept in the reformer 3, the CO shift converter 4, the CO remover and the fuel-cell main body 6 so that the prescribed chemical reactions and the power generation can be continued.

In the reactant air supply device, the reactant air fed into the water tank 21 by the pump 11 is humidified in the water tank 21 before it is supplied to the air electrode 6k of the fuel-cell main body 6. Reference numeral 29 represents an auxiliary pump when such reactant air is supplied to the air electrode 6k. The auxiliary pump 29 may be omitted.

As described later, the humidification of the reactant air is performed by forming a vapor-phase portion 53, supplying air from the air pump 11 into the water in the water tank 21 in which the water temperature is kept within a set temperature range, and feeding out bubbles in the water to the vapor-phase portion 53 while bubbling the water. As described above, the reactant air which has been provided with moisture is supplied from the water tank 21 to the air electrode 6k of the fuel-cell main body 6 so that the reaction in the fuel-cell main body can be properly kept.

Addition of water to the reformed gas to be supplied to the fuel electrode 6a of the fuel-cell main body 6 of the present invention is adjusted by adjusting the amount of processed water which is passed from the water tank 21 through the pump 22 and the heat exchanger 17 to the reformer 3. Since the processed water supplied to the heat exchanger 17 is vaporized into steam, if the ratio (S/C ratio) between the amount of the steam and the amount the raw fuel gas which are supplied to the reformer 3 is set to a higher value than the conventional S/C ratio of 2 to 3, for example, set to 3 to 4 in S/C ratio to thereby increase the water amount contained in the reformed gas output from the reformer 3 and also the reformed gas output from the CO remover 5 is directly supplied to the fuel-cell main body 6 without removing the moisture from the reformed gas so that no moisture is lost from high-concentration hydrogen gas from which CO is removed (that is, the S/C ratio is set to a high value), proper moisture could be provided to the reformed gas to be supplied to the fuel electrode 6a of the fuel-cell main body without specially providing an independent humidifying device for humidifying the fuel gas for reaction.

When there is a risk that the reformed gas is supplied into the fuel-cell main body 6 while the temperature of the reformed gas is kept to a high value which is substantially equal to the temperature of the gas output from the CO remover 5 as in the case of a cell having a structure in which the pipe length between the CO remover 5 and the fuel-cell main body 6 is short, and thus the temperature of the fuel-cell main body 6 is excessively increased, so that the power generation function is lowered and the electrode portion, etc. of the cell are damaged, it is preferable that a heat exchanger (not shown) is equipped in a pipe 70 between the CO remover 5 and the fuel-cell main body 6 and water from the water tank 21 or the like is made to flow into the heat exchanger to heat-exchange the water with the reformed gas, thereby adjusting the temperature of the reformed gas.

If the temperature of the reformed gas flowing into the fuel-cell main body 6 is kept to, for example, 80° C. or less by using such a heat exchanger as described above, the reformed gas could be supplied to the fuel-cell main body 6 under the state that the humidity of the reformed gas is set so that the saturation steam pressure at this temperature is substantially kept. Therefore, moisturizing of reformed gas (adjustment of humidity) can be implemented on various types of fuel cells having various structures with no thermal obstruction.

Not only the cooling water circulated in the fuel-cell main body 6 flows through the water pipe into the water tank 21, but also water or the like discharged from the fuel electrode 6a and the air electrode 6k of the fuel-cell main body 6 is stocked in the water tank 21. The reactant air to be supplied to the fuel-cell main body 6 may be humidified with such water and then supplied to the air electrode 6k or may be circulated in the cooling portion 6c to cool the fuel-cell main body 6.

The water returned into the water tank 21 as described above is not necessarily limited to the water from the fuel-cell main body 6. If water is substantially close to the processed water generated from the power generating system having the fuel cell as described above, the water is returned to the water tank 21 again to be recycled as water for humidification and supplied to the air electrode.

Therefore, the water tank 21 is equipped with a liquid level controller LC for keeping the water level of the processed water so that an air portion (vapor-phase portion) 53 is formed at the upper portion in the tank at all times, and a temperature adjusting means TC for keeping the water temperature in the water tank 21 within a set temperature range.

The liquid level controller LC is equipped with a controller for a water level gauge 54 and a motor operated valve 56, and serves to control the amount of the processed water in the water tank 21 so as to stock the processed water in the water tank 21 and form the vapor-phase portion 53 at the upper portion of the water tank while monitoring the water amount in the water tank 21 at all times so that the reactant air is properly humidified while passing through the water tank 21 and then supplied to the fuel-cell main body 6. The liquid level controller LC keeps the water level to a set value by controlling the pump for circulating water in the fuel cell or the heat exchanger of the power generating device GS using the fuel cell together with the temperature adjusting means TC. If the water level in the water tank cannot be kept to the set value under such a control operation, city water supplied from a water tap or the like through a water pipe 52 is processed by an ion exchange device of the processing device 51 to achieve processed water, and the processed water thus achieved is introduced into the water tank 21 by adjusting the opening degree of the motor operated valve 56 so that the water level in the water tank 21 is kept within a set range.

Reference numeral 55 represents a wave attenuating plate with which the detection of the water level by the water level gauge 54 mounted in the water tank 21 is prevented from being unstable due to fluctuation of the water surface which is caused by discharge of air supplied from the pump 11 into the water in the water tank 21.

The temperature adjusting means TC serves to adjust the temperature of the processed water in the water tank 21 so that the upper limit value of the temperature is varied in accordance with the operation temperature of the fuel cell, whereby the reactant air is properly humidified in the water tank 21 during passage thereof through the water tank 21 when the reactant air is supplied to the air electrode 6k of the fuel-cell main body 6. For example, the processed water is kept within the temperature range (set temperature) from 60° C. to 80° C. This water temperature control is performed by controlling a heating device 63 such as an electrical heater or the like which is equipped to the water tank 21, as occasion demands. The water temperature control is carried out by the temperature adjusting device TC such that the water temperature is set to a high value when it is necessary to provide a large amount of water to the reactant air or it is set to a low value when the cell can operate with even a small amount of water, that is, the temperature of the processed water is controlled so that the reactant air is provided with moisture suitable for the electrode structure or the cell structure used in the fuel cell.

A heat exchanger 18 is connected between the reformer 3 and the CO shift converter 4 and a heat exchanger 19 is connected between the CO shift converter 4 and the CO remover 5, and the processed water in the water tank 21 is circulated into the heat exchangers 18, 19 through pumps 23, 24 respectively to cool the gas passed through each of the reformer 3 and the CO shift converter 4 with the water.

A heat exchanger 17 is connected to an exhaust system 31 of the reformer 3, and the water from the water tank 21 is vaporized into steam by the heat exchanger 17, and the steam thus achieved is mixed with raw fuel gas passed through a pump 10 and then the mixture is supplied to the reformer 3. Further, another heat exchanger 32 is connected to the exhaust system 31 in addition to the heat exchanger 17, and water from the hot water reservoir tank 50 is circulated in the heat exchanger 32 through a pump 33 to perform exhaust heat recovery.

Reference numeral 34 represents a process gas (PG) burner. when the operation of the power generating system having the fuel cell is started, the PG burner 34 burns the reformed gas passed through the reformer 3, the CO shift converter 4 and the CO remover 5 until the reformed gas can be supplied to the fuel-cell main body 6 as gas having a stable and suitable composition for the operation of the fuel-cell main body, and the reformed gas is supplied into the fuel-cell main body 6 to perform the power generation after the operation of each reactor is stabilized. Off-gas which is not available for the power generation in the fuel-cell main body 6 is initially fed to the PG burner 34 to be burned. After the temperature of the fuel-cell main body 6 is stabilized, off-gas from the fuel-cell main body 6 is passed through a pipe 15 and introduced to the burner 12 of the reformer 3 to be burned.

Here, the control system for the PG burner 34 will be described.

After the power generating system of this embodiment is started, an opening/closing valve 91 is closed and an opening/closing valve 36 is opened until each reactor is stabilized in temperature. Accordingly, the reformed gas is supplied through a pipe 35 and the opening/closing valve 36 into the PG burner 34. When each reactor is stabilized in temperature, the opening/closing valves 91 and 39 are opened and the opening/closing valves 36 and 92 are closed until the temperature of the fuel-cell main body 6 is stabilized, so that the reformed gas is supplied to the burner 34 through a pipe 38 and the opening/closing valve 39 to be burned. Specifically, when the temperature of the fuel-cell main body 6 is increased to a predetermined temperature (for example, 60° C.) or more and the reformer 3, the CO shift converter 4, the CO remover 5, etc. are stabilized in temperature, the opening/closing valves 91, 39 are opened and the opening/closing valves 36, 92 are closed until the temperature of the fuel-cell main body 6 is stabilized in a temperature area near to an operation temperature (for example, from 70° C. to 80° C.), so that the fuel gas is supplied to the PG burner 34 through the pipe 38 and the opening/closing valve 39 to be burned.

When the temperature of the fuel cell 6 is stabilized at the operation temperature and the power generation is enabled to be continuously carried out, the opening/closing valves 91, 92 are opened while the opening/closing valves 36, 39 are closed, and the power generation is carried out in the fuel-cell main body 6. Off-gas which does not contribute to the reaction in the fuel-cell main body 6 is passed through the pipe 15 and supplied to the burner 12 to be burned.

A heat exchanger 46 is connected to the exhaust system 45 of the PG burner 34, and the water from the hot water reservoir tank 50 is circulated in the heat exchanger 46 through a pump 47 to perform exhaust heat recovery.

City water is supplied through a water pipe 61 into the hot water reservoir tank 50. The city water supplied in the hot water reservoir tank 50 is heated by the recovered exhaust heat of the fuel cell power generating system (the power generating system using the solid polymer type fuel cell) so that the temperature thereof is increased to a prescribed temperature, and the hot water thus heated is supplied through a hot water supply pipe 62 to the outside.

Figure 2:
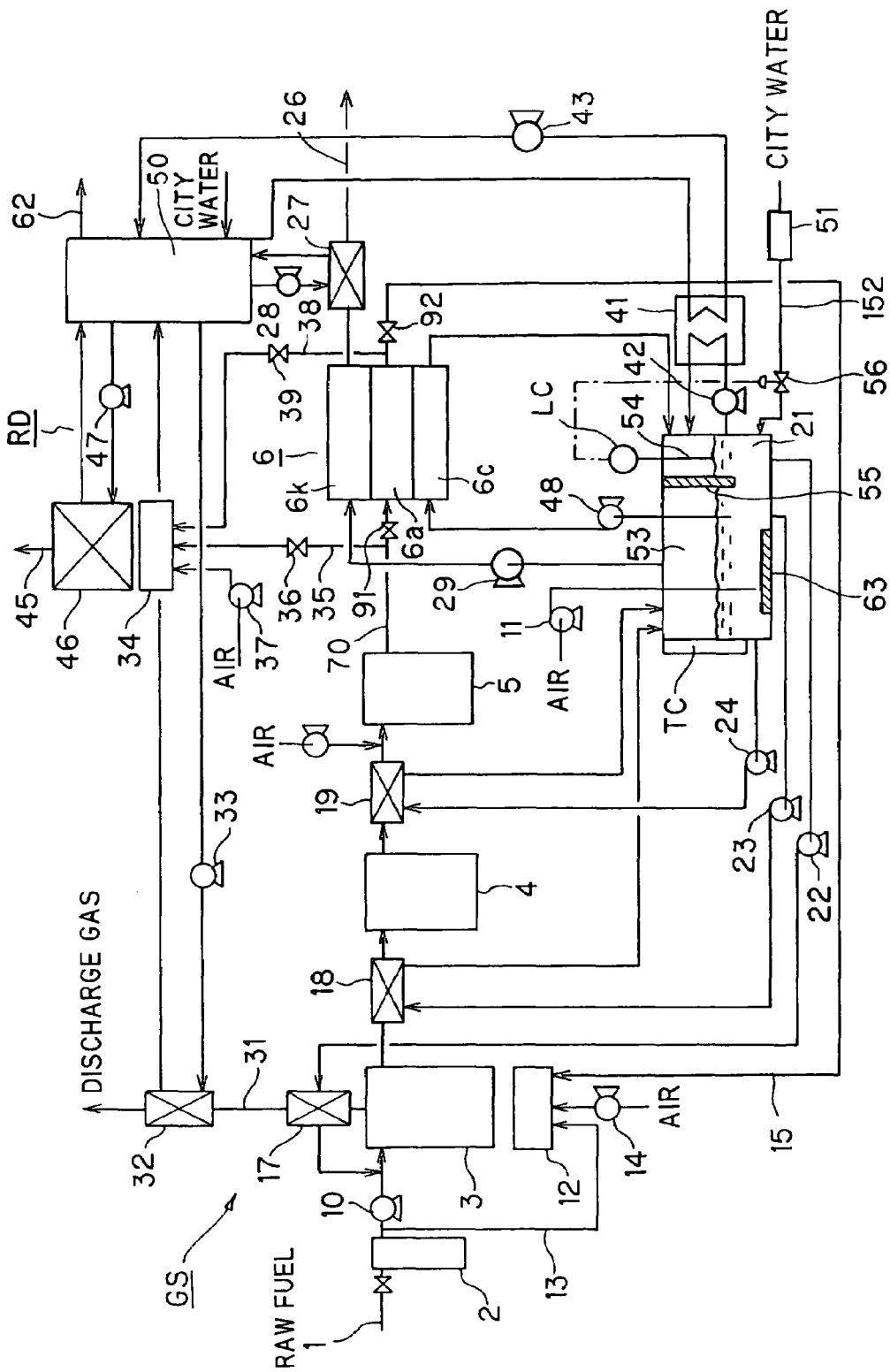
FIG. 2 is a systematic diagram showing a second embodiment of the power generating system equipped with the solid polymer fuel cell according to the present invention.

FIG. 2 is a diagram showing a second embodiment of the power generating system using the solid polymer type fuel cell according to the present invention.

This embodiment is different from the first embodiment shown in FIG. 1 in that it is equipped with a heat recovery device (heat exchanger 27) for recovering heat from the reactant air discharged from the air electrode 6k of the fuel-cell main body 6 and a heat exchanger 41 which is disposed between the water tank 21 and the hot water reservoir tank 50 to perform mutual heat exchange between the water tank 21 and the hot water reservoir tank 50. Since the other elements are the same as shown in FIG. 1, these elements are represented by the same reference numerals and symbols, and the description thereof is omitted.

An exhaust heat recovery has the heat exchangers 18, 19, 27, 32, 41 and 46 and the pumps 23, 24, 28, 33, 42, 43, 47, etc., and the exhaust heat recovery is performed by circulating the processed water of the water tank 21 and the hot water of the hot water reservoir tank 50 through these pumps into the heat exchangers.

Reference numeral 27 represents an exhaust-heat recovery heat exchanger equipped to a reactant air exhaust system 26 of the fuel-cell main body 6. City water from the hot water reservoir tank 50 is circulated in the heat exchanger 27 by the pump 28 to recover heat from the gas of 70° C. to 80° C. discharged from the air electrode 6k, and the hot city water thus heat-exchanged is stocked in the hot water reservoir tank 50. At the same time, the gas discharged from the fuel-cell main body 6 is cooled.

Reference numeral 41 represents the heat exchanger equipped to the water tank 21, and the processed water of the water tank 1 is circulated in the heat exchanger through the pump 42, and also the city water from the hot water reservoir tank 50 is circulated in the heat exchanger 41 through the pump 43 so that the processed water and the city water are not mixed with each other. The city water of the hot water reservoir tank and the processed water of the water tank 21 are properly heat-exchanged with each other through the heat exchanger 41. The temperature of the processed water of the water tank 21 can be adjusted through the heat exchange of the heat exchanger 41. In this case, the temperature adjusting means TC shown in FIG. 1 may be omitted.

In the embodiment shown in FIG. 2, the water tank 21 is used to humidify the reactant air to be supplied to the electrode. Therefore, it is given priority to keep the water temperature in the water tank within a set temperature range so that the air to be supplied to the air electrode 6k through the water tank 21 is kept properly humidified. When the temperature in the water tank 21 is excessively high, the pump 42 is driven and the pump 42, the pump 43, etc. are controlled so that heat transfer to the hot water reservoir tank 50 is enabled.

Figure 3:
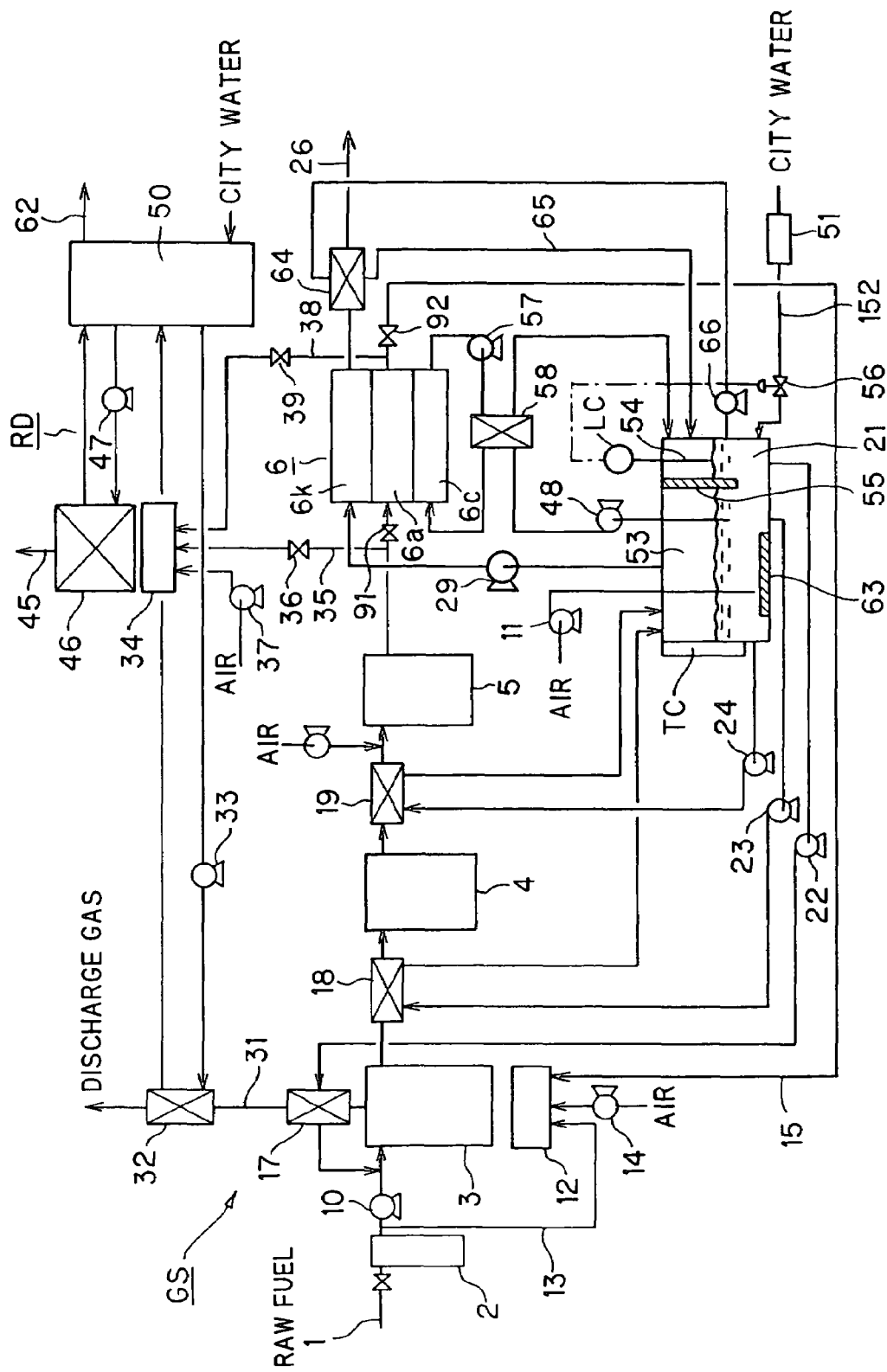
FIG. 3 is a systematic diagram showing a third embodiment of the power generating system equipped with the solid polymer fuel cell according to the present invention.

FIG. 3 is a diagram showing a third embodiment according to the power generating system using the solid polymer type fuel cell according to the present invention.

The third embodiment of FIG. 3 is different from the first embodiment shown in FIG. 1 in that an exhaust heat recovery device for discharge gas from the air electrode 6k of the fuel-cell main body 6 is equipped and cooling medium such as refrigerant, organic solvent or the like is available to cool the fuel-cell main body 6. The other elements are the same as shown in FIG. 1. Therefore, the same elements are represented by the same reference numerals and symbols, and the description thereof is omitted.

An exhaust heat recovery device according to this embodiment has the heat exchangers 18, 19, 32, 46, 58 and 64 and the pumps 23, 24, 33, 47, 59, 66, etc., and performs the exhaust heat recovery by circulating the processed water of the water tank 21 and the hot water of the hot water reservoir tank 50 in the heat exchangers through the pumps.

Reference numeral 58 represents a heat exchanger equipped to the cooling portion 6c. Organic cooling medium such as ethylene glycol or the like is circulated in the heat exchanger 58 by a pump 57 to cool the inside of the fuel-cell main body. Further, the processed water of the water tank 21 is circulated in the heat exchanger 58 by the pump 59 so that the processed water is not mixed with the organic cooling medium, and thus the heat of the cooling portion 6c of the fuel cell is recovered to the water tank 21.

By using such organic cooling medium to cool the fuel cell, the electrodes of the cell can be efficiently cooled, and the operation temperature of the cell can be kept under a high power-generation efficiency state. In addition, the temperature of the water of the water tank 21 which is used to humidify the gas (air) to be supplied to the electrode can be controlled by the temperature adjusting device TC so that the temperature is kept within a set temperature range.

Reference numeral 64 represents a heat exchanger for recovering heat from the discharge gas discharged from the air electrode 6k of the fuel-cell main body 6. The processed water of the water tank 21 is circulated in the heat exchanger 64 through the pipe 65 by the pump 66 to recover the heat of the discharge gas to the water tank 21.

Figure 4:
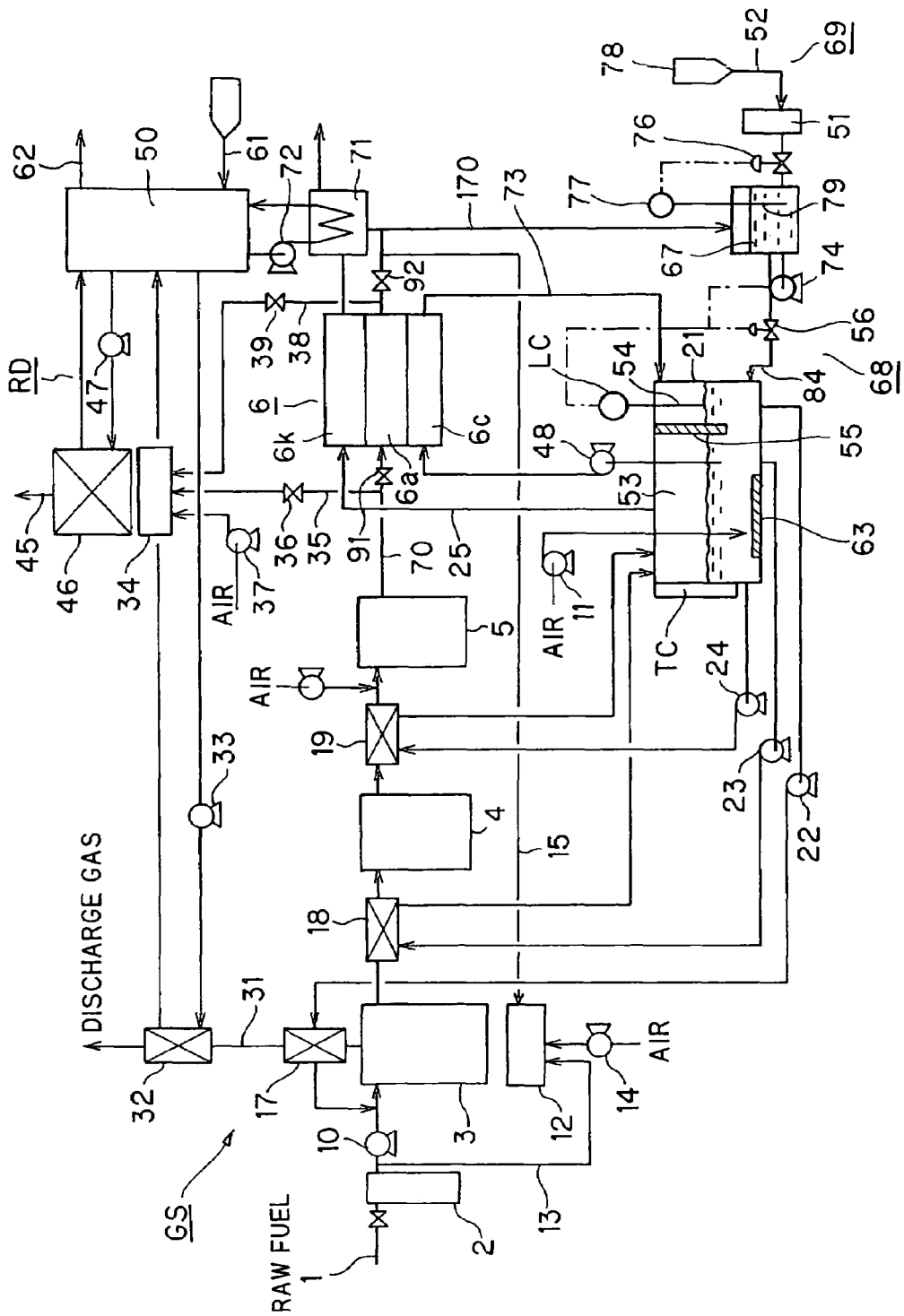
FIG. 4 is a systematic diagram showing a fourth embodiment of the power generating system equipped with the solid polymer fuel cell according to the present invention.

FIG. 4 shows a fourth embodiment of the power generating system using the solid polymer type fuel cell according to the present invention. In the embodiment shown in FIG. 4, the same parts as the first embodiment shown in FIG. 1 are represented by the same reference numerals. The duplicative description on the same parts is omitted, and only the different parts will be described.

The following embodiment of the present invention is characterized in that a mechanism using water generated in the fuel electrode and the air electrode of the fuel-cell main body is further equipped to the solid polymer type fuel cell of each of the first to third embodiments described above.

In the fuel cell according to the fourth embodiment shown in FIG. 4, the water which is supplied and passed through the heat exchangers 18, 19 by the pumps 23, 24 is returned into the processed water tank 21, and the cooling water which is circulated in the cooling portion 6c of the fuel-cell main body by the pump 48 and passed through the water pipe 73 flows into the processed water tank 21. Further, the processed water tank 21 is connected to a processed water resupply device 68 for resupplying water to the processed water tank 21. The processed water resupply device 68 comprises a motor operated valve 56, a water supply tank 67, a pump 74, etc.

The water supply tank 67 is a tank for temporarily stocking water generated in a city water resupply device 69 and the fuel-cell main body 6 and supplying the water to the processed water tank 21.

As the water generated from the fuel-cell main body 6 is withdrawn drain water achieved by introducing the steam-contained gas discharged from the air electrode 6k of the fuel-cell main body 6 to a heat exchanger 71 and then cooling the heat exchanger 71 with the water circulated between the heat exchanger 71 and the hot water reservoir tank 50 by a pump 72, and also water contained in the gas discharged from the fuel electrode 6a.

The water withdrawn into the water supply tank 67 is not necessarily limited to the water generated from the fuel-cell main body 6, and it may be drain water generated from the power generating system GS having the fuel cell. Any water is temporarily stocked in the water supply tank 67 and then supplied to the processed water tank 21.

The city water resupply device 69 is connected to a water (city water) source 78 through a water pipe 52 having a motor operated valve 76. When a water level gauge 79 detects reduction of the water level because the water amount in the water supply tank 67 is reduced like a case where the amount of water supplied from the water supply tank 67 into the processed water tank 21 is larger than the amount of water flowing into the water supply tank 67 from the fuel-cell main body 6, etc. as described above, a liquid level controller 77 of the city water resupply device 69 opens the motor operated valve 76 to supply the city water through the water pipe 52 and the water processing device 51 into the water supply tank 67 by using the water pressure of the water source 78, thereby keeping the water amount which does not obstruct supply of water to the processed water tank 21.

In this embodiment, the liquid level controller LC has a controller for the water level gauge 54 and the motor operated valve 56 to monitor the water amount in the water tank 21 at all times. In order to properly humidify the reactant air when the reactant air passes through the water tank 21 and then supply the reactant air thus humidified to the fuel cell 6, the amount of the processed water is controlled to stock the processed water in the tank 21 and form the vapor-phase portion 53 at the upper portion of the tank. When the set water level in the water tank cannot be maintained, the driving of the pump 74 is started and the opening degree of the motor operated valve 56 is adjusted to introduce the processed water from the water supply tank 67, thereby keeping the set range of the water level in the water tank 21.

Figure 5:
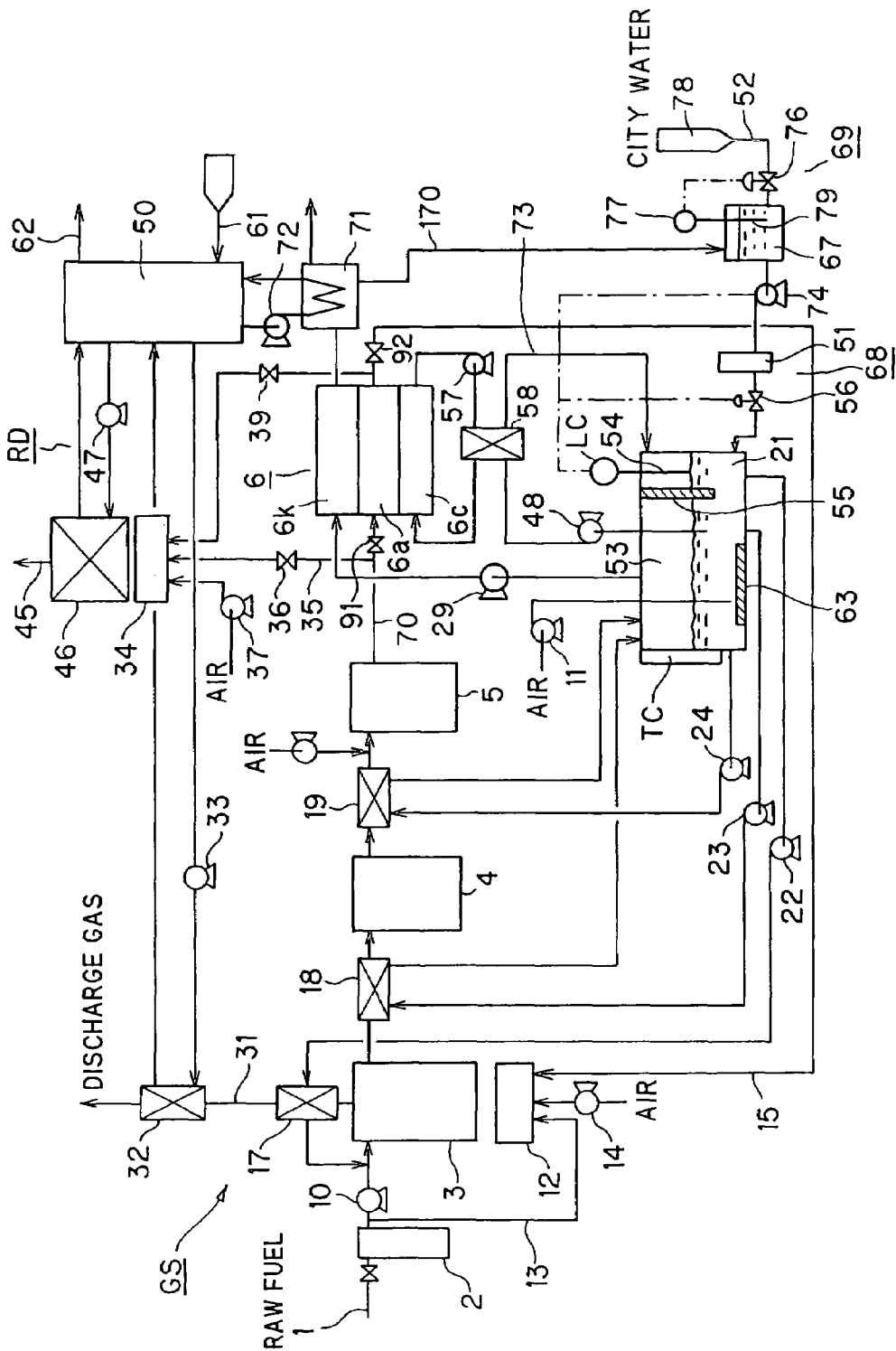
FIG. 5 is a systematic diagram showing a fifth embodiment of the power generating system equipped with the solid polymer fuel cell according to the present invention.

FIG. 5 is a diagram showing a fifth embodiment of the power generation system using the solid polymer type fuel cell according to the present invention.

The embodiment of FIG. 5 is different from the embodiment shown in FIG. 4 in that refrigerant, organic solvent or the like may be used as cooling medium for cooling the fuel-cell main body 6 and the water processing device 51 is disposed between the water supply tank 67 and the processed water tank 21. The construction of the other parts is the same as that shown in FIG. 1. Therefore, these parts are represented by the same reference numerals, and the description thereof is omitted.

In the solid polymer type fuel cell having the processed water resupply device 68 according to the embodiment of FIG. 5, reference numeral 58 represents a heat exchange equipped to the cooling portion 6c of the fuel-cell main body 6, and organic cooling medium such as ethylene glycol or the like is circuited in the heat exchanger 58 by the pump 57 to cool the inside of the fuel cell.

Further, the processed water of the processed water tank 21 is circulated in the heat exchanger 58 by the pump 59 so that the processed water is not mixed with the organic cooling medium, whereby heat of the cooling portion 6c of the fuel cell is recovered to the processed water tank 21.

By using the organic cooling medium to cool the fuel cell, the electrodes of the cell can be effectively cooled to keep the operation temperature of the cell under a high power generation efficiency state.

Reference numeral 71 represents a heat exchanger to recover heat and withdraw water from the gas discharged from the air electrode 6k of the fuel-cell main body. Water of the hot water reservoir tank 50 is circulated in the heat exchanger 71 by a pump 72, and heat achieved from the circulated water is stocked in the hot water reservoir tank 50. In addition, drain water condensed from the cooled discharge gas is passed through a pipe 170 and withdrawn to the water supply tank 67.

In the processed water resupply device 68 of the embodiment shown in FIG. 5, the water processed device 51 is disposed between the water supply tank 67 and the processed water tank 21, particularly between the pump 74 and the motor operated valve 56. Therefore, when the liquid level controller LC detects lack of the water amount in the processed water tank 21 by the water level gauge 54 to open the motor operated valve 56 and start the driving of the pump 74, the overall water resupplied from the water supply tank 67 is necessarily improved in water quality by the water processed device 51, and then supplied to the processed water tank 21.

According to the processed water resupply device 68 used for the cell the embodiment of FIG. 5, on the assumption of the fuel cell having such a structure that a large amount of water is not lost by the operation of the fuel cell, sufficient water can be withdrawn from the cell and most of water thus withdrawn is not polluted, the overall resupply water to be supplied to the processed water tank 21 is passed through the water processed device 51, and the processing water supply device for withdrawing and resupplying water is constructed by the simplest construction.

When the amount of water from the fuel cell or the power generation system or the drain water withdrawn is reduced due to driving the of the fuel cell 6, the liquid level controller 77 of the water supply tank 67 controls the motor operated matter to resupply city water from the water source 78 into the water tank supply 67 as in the case of the embodiment shown in FIG. 4, and the city water is supplied to the processed water tank 21 together with the city water to complement the lack of water of the cell, etc.

Figure 6:
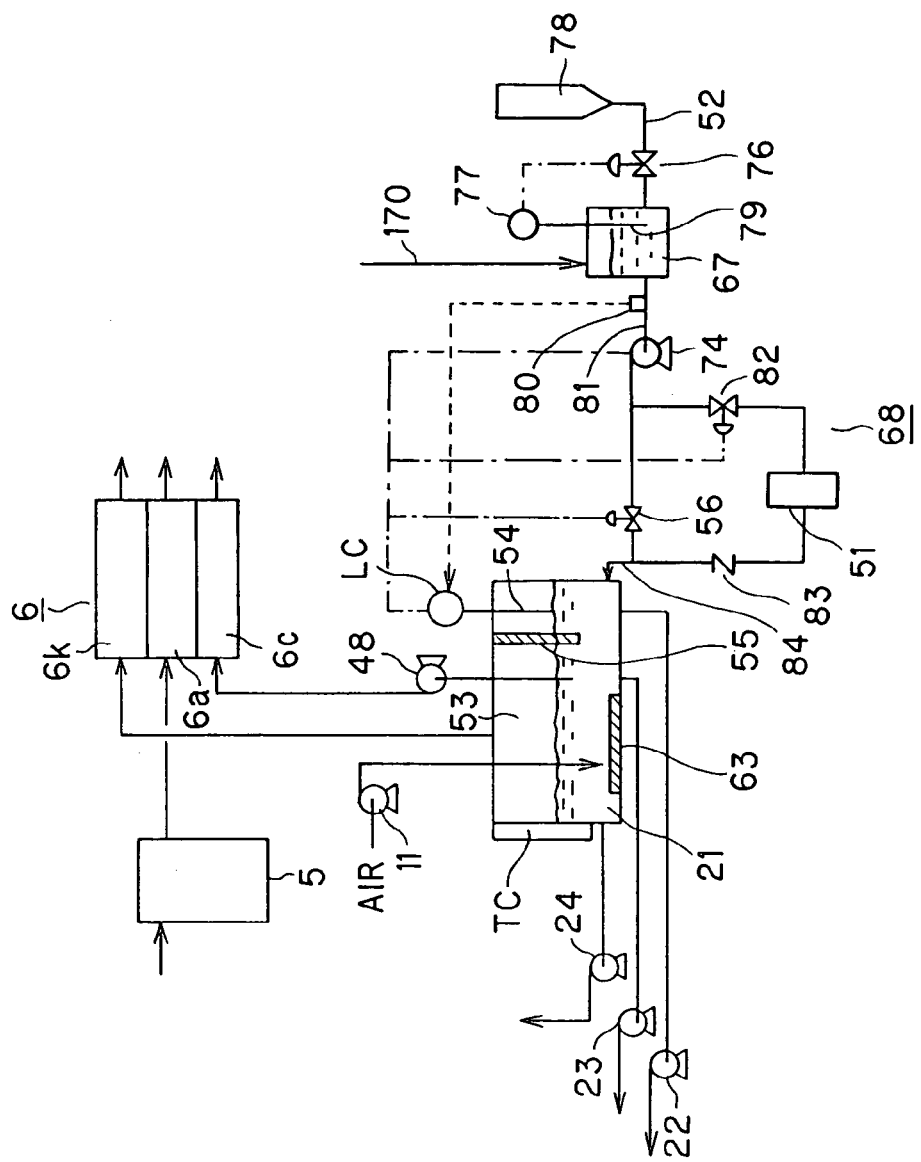
FIG. 6 is a systematic diagram showing withdrawal of processed water and the construction of the main part of a resupplying device in the solid polymer type fuel cell according to the third embodiment of the present invention.

FIG. 6 is a diagram showing the main part for water withdrawal and supply in a sixth embodiment of the power generating system using the solid polymer type fuel cell according to the present invention.

The embodiment of FIG. 6 is different from the embodiments shown in FIGS. 4 and 5 in that there is equipped a water supply tank for temporarily stocking water generated in the fuel cell, etc. through a pipe 170 and the water is passed through the water processing device 51 only when the water quality of water to be supplied from the water supply tank 67 to the processed water tank 21 is lowered. The other parts are the same as the construction shown in FIGS. 4 and 5. Therefore, the same parts are represented by the same reference numerals and symbols, and the description thereof is omitted.

In the solid polymer type fuel cell having the processed water resupply device 68 according to the embodiment shown in FIG. 6, reference numeral 80 represents a water quality sensor fixed to a water outlet pipe 81 of the water supply tank, reference numeral 82 represents a motor operated valve for controlling water passage through the water processing device 51, which bypasses the motor operated valve 56, and reference numeral 83 represents a check valve for preventing counter flow of water from a water supply pipe 84 at the processed waster tank 21 side to the water processing device 51 side. The liquid level controller LC of the processed water tank 21 receives signals from the water level gauge 54 and the water quality sensor 80 and controls the operation of the pump 74 and the motor operated valves 56 and 82 so that water having water quality required for the fuel cell, etc. is supplied from the water supply tank 67.

In the embodiment shown in FIG. 6, when the water quality of water resupplied from the water supply tank 67 to the processed water tank 21 does not obstruct the operation of the fuel cell, etc., the liquid level controller LC receives a signal from the water level gauge 54 to operate the pump 74 and the motor operated valve 56, and supplies the water having the needed water quality from the water supply tank 67 to the tank 21 while bypassing the water processing device 51.

Conversely, when the water quality of water to be resupplied is lowered to the extent that it may influence the operation of the fuel cell, etc., the liquid level controller LC receives a signal from the water level gauge 54 to operate the pump 74 and the motor operated valve 82 (the motor operated valve 56 is closed), and controls the equipment so that water having the water quality needed after the water processing is carried out in the water processing device 51 is supplied to the processed water tank 21.

The judgment on the water quality may be made by using a conductometric device (not shown) or the water quality sensor 80 every time water is supplied from the water supply tank 67. However, when the construction of the equipment is simplified, in place of use of a sensor such as a conductometric device or the like, there may be used a method of determining a time cycle estimated to be needed for the water quality improving processing on the basis of the driving time of the fuel cell 6 and other control data, determining the driving time every time cycle and opening the motor operated valve 82 to pass water through the water processing device 51.

In the solid polymer type fuel cell according to this embodiment, on the assumption that the drain water, etc. generated in the cell have high water quality to the extent that it can be directly resupplied and recycled for humidification of air, reformation of fuel gas and cooling of the cell, when water processing is required during some cycles of the water supplying and circulating operation of supplying water from the water supply tank 67 to the processed water tank 21, the drain water, etc. are passed through the water processing device 51 and then supplied to the processed water tank 21.

Accordingly, the using frequency of the water processing device used in the solid polymer type fuel cell and the water passage time through the ion exchange resin are reduced at the maximum to increase the lifetime thereof, so that a labor needed to exchange the ion exchange resin, etc. and a labor need for maintenance of the solid polymer type fuel cell can be reduced.

As described above, in the solid polymer type fuel cell according to the present invention, the water tank for stocking cooling water used to cool the fuel cell and the power generation system having the fuel cell is added with the temperature adjusting device and the liquid level controller, and the reactant air is passed through the water tank described above. Accordingly, according to the present invention, the reactant air can be added with moisture (i.e., humidified) and then supplied to the electrodes of the fuel cell without any independent and dedicated humidifier for humidifying the reactant air.

Further, according to the present invention, a water circulating device and a water withdrawing device for cooling and heat recovery which are used in this type of conventional water tank can be almost directly used for the processed water resupply control and the processed water withdrawal for humidification of gas. Therefore, unlike a vapor/water separating device for generating steam, a solid polymer type fuel cell having a humidifying device which can simply humidify the reactant air can be provided.

In the solid polymer type fuel cell thus constructed and the power generating system having the solid polymer type fuel cell thus constructed, a co-generation system for power generation and heat application can be easily established. Therefore, not only the efficiency of power generation alone can be enhanced, but also highly effective use of energy of fuel to be supplied to this system can be promoted. Therefore, high total heat efficiency can be achieved, so that the consumption amount of raw material can be reduced and the discharge amount of carbon dioxide can be also reduced.

Particularly when tanks having the function of stocking heat such as the hot water tank and the water tank are designed to mutually receive/deliver heat therebetween, a mechanism of heating the water of the water tank with heat occurring in the power generation system having the fuel cell can be constructed. Therefore, the reactant gas to be supplied to the electrodes of the fuel-cell main body can be simply humidified while the heat of the overall system is effectively used, for example by using the heat of the system having the fuel cell to heat the water tank, giving extra heat of the water tank to the hot water tank when the heat of the water tank is too much, etc.

Further, in the solid polymer type fuel cell according to the present invention, the device for withdrawing water generated in the fuel-cell main body and recycling the water thus withdrawn for the fuel cell conducts the water processing and supplying the water thus processed to the fuel cell while monitoring the water quality of the water thus withdrawn, as occasion demands. Therefore, the use frequency of the water processing device comprising the ion exchanger, etc. can be limited to the minimum level.

Still further, there can be provided a solid polymer type fuel cell which can simplify the water processing in the fuel cell by recycling the water generated in the fuel cell at maximum level and thus reduce the troublesome task for maintenance.

In the power generation system having the solid polymer type fuel cell thus constructed and the power generation system having the cell, the maintenance of the fuel cell is simplified, so that the co-generation of power generation and heat utility can be easily established. Therefore, there can be provided a solid polymer type fuel cell which contributes to not only enhancement of the power generation efficiency of the fuel cell alone, but also the effective recycling of water used in this system and the effective use of energy of fuel cell to be supplied.

In the above embodiments, all the processed water from the water tank 21 is directly supplied and used as humidifying water for the reformer 3 and for the reactant air to be supplied to the air electrode 6k of the fuel-cell main body. However, the processed water may be supplied to only a part of the fuel-cell main body (for example, the fuel electrode or the air electrode) or only the reformer, or it may be indirectly supplied as in the case of the supply of cooling water to the heat exchanger 58 in the embodiment shown in FIGS. 3, 5.

INDUSTRIAL UTILIZATION

As described above, according to the present invention, equipment such as a liquid level controller or the like is installed in the water tank of processed water used in the solid polymer type fuel cell to provide the solid polymer type fuel cell with the humidifying mechanism, thereby humidifying the reactant air. Therefore, the present invention is suitably applied to a fuel cell having no special dedicated humidifier for humidifying reactant air and also to a power generation system having the fuel cell. Further, the water tank in which the processed water used for the fuel cell is stocked is organically coupled to the fuel cell or the power generation system having the fuel cell to effectively use the heat of the fuel cell, so that the water temperature in the water tank is kept to a temperature suitable for humidification. Therefore, the energy consumption for humidification can be reduced at the maximum level, and moisture can be added to gas such as reactant gas, etc. to be supplied to the electrodes of the fuel cell while the energy efficiency of the fuel cell and the overall power generation system combined with the fuel cell is enhanced.

The invention claimed is:

1. A solid polymer type fuel cell comprising:
   a fuel-cell main body for performing power generation through the electrochemical reaction between hydrogen in reformed gas and oxygen in reactant air;
   a reactant air supply portion for supplying the reactant air to the fuel-cell main body;
   a reformed gas supply portion for supplying the reformed gas to said fuel-cell main body; and a processed water supply portion comprising a processed water tank for stocking processed water and for supplying processed water, wherein said processed water tank supplies the processed water to said reformed gas supply portion to humidify the reformed gas,
humidifies the reactant air supplied from said reactant air supply portion by using the processed water, and supplies the humidified reactant air to said fuel-cell main body,
wherein said water supply portion comprises water processing means for subjecting water to predetermined processing and supplying the processed water to the processed water tank, and
wherein said water supply portion further comprises a liquid level control portion for keeping the water level of processed water in a predetermined range so that a gas-phase portion is formed in said water tank at all times, the reactant air from said reactant air supply portion being humidified while passing through said water tank and supplied to said fuel-cell main body.

2. The solid polymer type fuel cell as claimed in claim 1, further comprising a cooling portion for circulating the processed water from said processed water supply portion to said fuel-cell main body to cool said fuel-cell main body.

3. The solid polymer type fuel cell as claimed in claim 1, wherein said liquid level control portion comprises a water level gauge for detecting the water level of the processed water and a motor operated valve for controlling supply of the processed water from a processed water source into said processed water tank.

4. The solid polymer type fuel cell as claimed in claim 1, wherein said processed water supply portion comprises a processed water tank in which processed water is stocked, and temperature adjusting means for keeping the temperature of the processed water in said processed water tank in a predetermined range, wherein the degree of humidification is adjusted by a set temperature when the reactant air from said reactant air supply portion is humidified while passing through said processed water tank.

5. The solid polymer type fuel cell as claimed in claim 4, wherein the upper limit value of the predetermined range of the processed water to be adjusted by said temperature adjusting means is varied in accordance with the operation temperature of said fuel cell.

6. The solid polymer type fuel cell as claimed in claim 5, wherein the predetermined temperature range of the processed water to be adjusted by said temperature adjusting means ranges from 60°C to 80°C.

7. The solid polymer type fuel cell as claimed in claim 4, wherein said temperature adjusting means has an electrical heater.

8. The solid polymer type fuel cell as claimed in claim 1, further comprising a steam supply portion for vaporizing the processed water from said processed into steam and adding the steam to raw material supplied to said reformed gas supply portion, wherein said steam supply portion adjusts the addition amount of water so that the ratio (S/C ratio) between the amount of supplied water and the amount of raw fuel gas ranges from 3to 4.

9. The solid polymer type fuel cell as claimed in claim 1, wherein said reformed gas supply portion has a CO remover for reducing the concentration of carbon monoxide in the reformed gas, and the reformed gas output from said CO remover is supplied to said fuel-cell main body without removing moisture therefrom.

10. The solid polymer type fuel cell as claimed in claim 1, further comprising water processing means for subjecting city water to predetermined processing to generate processed water having low electrical conductivity, and supplying the processed water thus generated to said processed water supply portion.

11. The solid polymer type fuel cell as claimed in claim 1, further comprising an exhaust heat recovery portion that is supplied with high-temperature gas discharged from said fuel-cell main body and recovers heat generated in said fuel-cell main body through the electrochemical reaction between hydrogen in the reformed gas and oxygen in the reactant air.

12. The solid polymer type fuel cell as claimed in claim 11, wherein said exhaust heat recovery portion comprises a heat exchanger in which water is circulated to be heat-exchanged with high-temperature gas discharged from said fuel-call main body, and a hot water tank for stocking hot water from said heat exchanger and supplying water to said heat exchanger.

13. The solid polymer type fuel cell as claimed in claim 12, further comprising a heat exchanger that is attached to said processed water supply portion and performs the heat exchange between the processed water and the water while the processed water and the water are circulated in said heat exchanger so as not to be mixed with each other.

14. The solid polymer type fuel cell as claimed in claim 11, wherein said exhaust heat recovery portion comprises a heat exchanger in which the processed water from said processed water supply portion is circulated to be heat-exchanged with high-temperature gas discharged from said fuel-cell main body, thereby performing exhaust heat recovery.

15. The solid polymer type fuel cell as claimed in claim 1, further comprising a cooling portion in which cooling refrigerant is circulated, said cooling portion being attached to said fuel-cell main body and performing heat exchange with said fuel-cell main body to cool said fuel-cell main body, wherein heat exchange is performed between the processed water from said processed water supply means and the cooling refrigerant from said cooling portion while the processed water and the cooling refrigerant are circulated without being mixed with each other, thereby recovering heat generated in said fuel-cell main body to said processed water supply portion.

16. The solid polymer type fuel cell as claimed in claim 1, further comprising a water withdrawing portion for withdrawing water generated in said fuel-cell main body.

17. The solid polymer type fuel cell as claimed in claim 16, wherein said water withdrawing portion comprises a heat exchanger for performing the heat exchange between discharge gas from said fuel-cell main body and water circulated therein to liquefy and withdraw water from the discharge gas, and a water resupply portion for temporarily stocking the water withdrawn by said heat exchanger and city water.

18. The solid polymer type fuel cell as claimed in claim 17, wherein said water resupply portion supplies the stocked water to said processed water supply portion in accordance with the water level thereof.

19. The solid polymer type fuel cell as claimed in claim 18, wherein said water resupply portion comprises a water level gauge for detecting the water level and controls supply of the city water to said water resupply portion and supply of stocked water to said processed water portion in accordance with the detection result of said water level gauge.

20. The solid polymer type fuel cell as claimed in claim 17, further comprising a water processing portion disposed at the front stage of said water resupply portion or between said water resupply portion and said processed waster supply portion, said water processing portion performing predetermined processing on city water to generate processed water having low electrical conductivity, and supplying the processed water thus generated to said water resupply portion or said processed water supply portion.

21. The solid polymer type fuel cell as claimed in claim 16, further comprising a cooling portion which is attached to said fuel-cell main body and in which cooling refrigerant is circulated to be heat-exchanged with said fuel-cell main body to cool said fuel-cell main body, wherein the processed water from said processed water means and the cooling refrigerant from said cooling portion are heat-exchanged with each other while the processed water and the cooling refrigerant are circulated so as not to be mixed with each other, thereby recovering heat generated in said fuel-cell main body to said processed waster supply portion.

22. The solid polymer type fuel cell as claimed in claim 17, further comprising: a first processed water supply path for directly supplying the stocked water of said water resupply portion to said processed supply portion; a second processed water supply portion for supplying, through a water processing device for conducting predetermined processing on the stocked water of said water resupply portion to generate processed water having low electrical conductivity, the processed water to said processed water supply portion; a water quality detector for detecting the water quality of the stocked water of said water resupply portion; and a processed water path switching portion for selecting one path of said first processed water supply path and said second processed water supply path and supplying the processed water to said processed water portion, which are disposed between said water resupply portion and said processed water supply portion.

23. The solid polymer type fuel cell as claimed in claim 22, wherein said water quality detector comprises a conductometric device of water or water quality sensor.

24. The solid polymer type fuel cell as claimed in claim 17, further comprising: a first processed water supply path for directly supplying the stocked water of said water resupply portion to said processed supply portion; a second processed water supply portion for supplying, through a water processing device for conducting predetermined processing on the stocked water of said water resupply portion to generate processed water having low electrical conductivity, the processed water to said processed water supply portion; and a processed water path switching portion for selecting one path of said first processed water supply path and said second processed water supply path at a predetermined time cycle and supplying the processed water to said processed water portion, which are disposed between said water resupply portion and said processed water supply portion.

25. The solid polymer type fuel cell as claimed in claim 1, wherein said water processing portion further includes a mechanism for heating the processed water of said processed water supply portion by heat generated from a power generation system having said fuel cell.

26. The solid polymer type fuel cell as claimed in claim 25, wherein said mechanism has a heat exchanger for adjusting the temperature of the processed water of said processed water supply portion through heat exchange using the heat generated in said power generating system.

27. The solid polymer type fuel cell as claimed in claim 1, further comprising a heat exchanger that is attached to said processed water supply portion and in which the processed water in said processed water supply portion is circulated, wherein the temperature of the processed water in said processed water supply portion is adjusted through the heat exchange in said heat exchanger.

28. A solid polymer type fuel cell comprising:
a fuel-cell main body for performing power generation through the electrochemical reaction between hydrogen in reformed gas and oxygen in reactant air;
a reactant air supply portion for supplying the reactant air to the fuel-cell main body;
a reformed gas supply portion for supplying the reformed gas to said fuel-cell main body; and
a processed water supply portion comprising a processed water tank for stocking processed water and for supplying processed water, and a water processing means for subjecting water to predetermined processing and supplying the processed water to the processed water tank;
wherein said reactant air supply portion communicates with an inlet of the processed water tank for humidifying the reactant air before the reactant air is supplied to the fuel-cell main body,
wherein said process water tank comprises a first outlet communicating with said reformed gas supply portion for supplying processed water to said reformed gas supply portion to humidify the reformed gas, and a second outlet communicating with the fuel-cell main body for supplying humidified reactant air to said fuel-cell main body, and
wherein said processed water supply portion further comprises a liquid level control portion for keeping the water level of processed water in a predetermined range so that a gas-phase portion is formed in said water tank at all times, the reactant air from said reactant air supply portion being humidified while passing through said water tank and supplied to said fuel-cell main body.

* * * * *